United States Patent
Hähnel

(10) Patent No.: US 10,899,947 B2
(45) Date of Patent: Jan. 26, 2021

(54) METHOD FOR PLASMA-INITIATED ADHESIVE BONDING

(71) Applicant: TESA SE, Norderstedt (DE)

(72) Inventor: Marcel Hähnel, Norderstedt (DE)

(73) Assignee: TESA SE, Norderstedt (DE)

( * ) Notice: Subject to any disclaimer, the term of this patent is extended or adjusted under 35 U.S.C. 154(b) by 405 days.

(21) Appl. No.: 15/128,330

(22) PCT Filed: Mar. 27, 2015

(86) PCT No.: PCT/EP2015/056701
§ 371 (c)(1),
(2) Date: Sep. 22, 2016

(87) PCT Pub. No.: WO2015/150251
PCT Pub. Date: Oct. 8, 2015

(65) Prior Publication Data
US 2017/0114250 A1   Apr. 27, 2017

(30) Foreign Application Priority Data

Apr. 1, 2014 (DE) .................. 10 2014 206 220

(51) Int. Cl.
| | | |
|---|---|---|
| *C09J 5/00* | (2006.01) | |
| *C09J 11/02* | (2006.01) | |
| *C08F 2/52* | (2006.01) | |
| *C09J 4/06* | (2006.01) | |
| *C09J 5/08* | (2006.01) | |
| *C08K 5/00* | (2006.01) | |
| *C08K 3/34* | (2006.01) | |

(52) U.S. Cl.
CPC ............ *C09J 5/00* (2013.01); *C08F 2/52* (2013.01); *C09J 4/06* (2013.01); *C09J 5/08* (2013.01); *C09J 11/02* (2013.01); C08K 3/34 (2013.01); C08K 5/0091 (2013.01); *C09J 2301/302* (2020.08); *C09J 2301/416* (2020.08); *C09J 2421/00* (2013.01); *C09J 2475/00* (2013.01)

(58) Field of Classification Search
CPC ......... C09J 5/00; C09J 4/06; C09J 5/08; C09J 11/02; C09J 2205/31; C09J 2201/606; C09J 2421/00; C09J 2475/00; C08F 2/52; C08K 5/0091; C08K 3/34
See application file for complete search history.

(56) References Cited

U.S. PATENT DOCUMENTS

| | | | |
|---|---|---|---|
| 4,212,719 A | 7/1980 | Osada et al. | |
| 4,487,810 A * | 12/1984 | Ascarelli | .............. C08K 3/34 |
| | | | 428/461 |
| 4,898,899 A | 2/1990 | Isobe | |
| 6,747,102 B1 | 6/2004 | Christie et al. | |
| 2009/0081469 A1 | 3/2009 | Oka et al. | |
| 2009/0286950 A1* | 11/2009 | Schumann | ......... C08G 18/0895 |
| | | | 528/67 |
| 2013/0280539 A1 | 10/2013 | Wilken et al. | |

FOREIGN PATENT DOCUMENTS

| | | | |
|---|---|---|---|
| CA | 2835046 | * | 11/2012 |
| CN | 101124287 A | | 2/2008 |
| CN | 101213267 A | | 7/2008 |
| DE | 4242059 C1 | | 3/1994 |
| EP | 0193006 A1 | | 9/1986 |
| JP | 2000044829 A | | 2/2000 |
| JP | 2007095901 A | | 4/2007 |
| JP | 2012136693 A | | 7/2012 |
| WO | 2006121174 A1 | | 11/2006 |
| WO | WO-2012-152713 | * | 11/2012 |
| WO | 2013079952 A1 | | 6/2013 |

OTHER PUBLICATIONS

German Search Report for corresponding application DE 10 2014 206 220.9 dated Jan. 9, 2015.
International Search Report for corresponding application PCT/EP2015/056701 dated Jun. 26, 2015.
Chinese Office Action for corresponding application CN 201580017838.4 dated Sep. 25, 2018.
Translation of Office Action dated Mar. 11, 2019, in connection with Korean Patent Application No. 10-2016-7030177.

* cited by examiner

*Primary Examiner* — Michael N Orlando
*Assistant Examiner* — Cynthia L Schaller
(74) *Attorney, Agent, or Firm* — Norris McLaughlin, P.A.

(57) ABSTRACT

The invention relates to a method for producing an adhesive bond by means of an adhesive, wherein a composition containing at least a substance reactive in a radical polyreaction and a catalytically active substance is used as the adhesive, wherein at least one metal complex from the group of the metal phthalocyanines and/or from the group of the metal porphyrins is selected as the catalytically active substance, wherein a polyreaction of the reactive substance occurs, which polyreaction is initiated by the application of a plasma.

20 Claims, No Drawings

METHOD FOR PLASMA-INITIATED ADHESIVE BONDING

This application is a § 371 U.S. National stage of PCT International Patent Application No. PCT/EP2015/056701, filed Mar. 27, 2015, which claims foreign priority benefit of German Patent Application No. DE 10 2014 206 220.9, filed Apr. 1, 2014, the disclosures of each of which patent applications are incorporated herein by reference.

The invention relates to a method for producing an adhesive bond where the adhesive used comprises a composition comprising at least one polymerizable monomer variety and a catalytically active substance.

High bond strengths are frequently achieved using curing adhesive systems where the composition used as adhesive undergoes curing through polymerization reactions, thereby bringing about the permanent joining of the adherends to one another.

One kind of curing systems are two-component adhesive systems. These adhesive systems have been general knowledge for years and described at length in the technical literature. An adhesive system consisting of two components is applied to the parts to be bonded, with usually two liquid components being employed. For example, in the case of chemically reacting 2-component polymerization adhesive systems, one component consists of the monomer to be polymerized and an activator, and the other component consists of a radical-forming substance (also called curing agent or initiator) and the monomer to be polymerized. After the two components have been thoroughly mixed or at least brought into contact with one another, and optionally after activation, which usually takes place thermally, the radical-forming substance is split by the activator into two radicals, and the polymerization reaction of the monomers to be polymerized commences. The radical chain polymerization of the monomer takes place subsequently until there is chain termination, and the adhesive cures, so producing a permanent bond between the parts to be bonded.

A disadvantage of liquid 2-component polymerization adhesive systems of this kind is that their use often involves uncleanliness, since the two components must usually be applied in liquid to pastelike form to the parts that are to be bonded. This is problematic especially in the case of expansive bonds and/or in applications where the surfaces are uneven, being inclined, for example. Moreover, the adhesive system is activated generally at elevated temperatures, something which may be a problem for sensitive substrates, such as anodized aluminum, for example. A further disadvantage of such systems is that the storage stability of the two components may be critical. Furthermore, after complete curing, conventional 2-component polymerization adhesive systems frequently are synonymous with problems which become visible only in the event of vibrations. For instance, with the systems of the prior art, in the region of the adhesive bonds, severe vibrations may cause cracks or fractures.

One alternative, particularly in order to ensure better handling properties, is the use of curing systems in film form. These systems are employed in polymeric form, so that the adhesive film has the necessary intrinsic stability. The curing reaction can be brought about by reactive groups in the composition of the adhesive. Curing is initiated in particular by thermal energy (so-called heat-activatable adhesive films). The problems this entails for sensitive systems, such as plastics, for instance, have already been mentioned above.

At room temperature it is possible to use pressure-sensitive adhesive films, where the bonding is brought about by an intrinsic tack inherent to the adhesive. These systems, however, generally do not produce the same bonding strengths as curing systems.

Low-pressure plasma treatment is a known method for the surface pretreatment of adhesives. The plasma causes activation of the surface in the sense of a greater reactivity. There are chemical changes to the surface, which may for example influence the behavior of the adhesive relative to polar and apolar surfaces. This pretreatment substantially comprises surface phenomena, and not reactions in the interior of the adhesive layer.

Also described in the prior art is the fundamental possibility of initiating polymerization reactions by exposure to plasma.

EP 193 006 A describes the polymerization of monomers in liquid and gaseous states with exposure to a plasma. Photoinitiators or crosslinkers are added. The monomers, however, are reacted only to conversions of a few double-digit percentage numbers. Unreacted monomers must be washed out of the polymer again, which is laborious.

A polymerization triggered by plasma in a low-pressure process, without the use of photoinitiators or crosslinkers, is described in U.S. Pat. No. 4,212,719 A. A continuation of the polymerization after the plasma treatment has been shut off is also described. The times stated for the post-plasma polymerization are in the region of in some cases much more than two days. In this specification as well, the monomer conversions achieved are no more than low.

The aforementioned processes can therefore not be used for curing adhesives which are intended to lead to high bonding strengths.

It is an object of the invention to offer a method for adhesive bonding on a substrate or of two or more substrates to one another, with which a high bonding strength can be achieved, even at moderate activation temperatures.

The object is achieved by means of a method for producing an adhesive bond by means of an adhesive, the adhesive used comprising a composition comprising at least a) one substance which is reactive in radical polymerization reactions and b) at least one metal complex from the group of the metal phthalocyanines and/or from the group of the metal porphyrins as catalytically active substance, the reactive substance a), for the adhesive bond, undergoing a polymerization reaction which is initiated by exposure to a plasma.

An adhesive is understood accordingly in this specification to be a chemical composition which, either immediately or only through activation, by chemical reaction of its components with one another and/or with further reactants (such as, for instance, the surfaces of the substrates to be bonded), is able to bring about adhesive bonding (reactive adhesives). Adhesives are also understood to be chemical compositions which inherently have a sufficient intrinsic tack to be able to bring about adhesive bonding, optionally with exposure to a greater or lesser applied pressure (pressure-sensitive adhesives or self-adhesives). Reactive adhesives as well may, but need not, be tacky prior to such activation.

The term "adhesive agent" describes the presentation form and the use form of the adhesive, in that the articles thus identified comprise the adhesive and therefore in principle—optionally after activation—are capable of bringing about an adhesive bond by way of the adhesive. Adhesive agents may consist exclusively of the adhesive, or may comprise further components.

Accordingly, the terms "adhesive film" and "adhesive tape" are used in the sense of adhesive agents in film and tape form, respectively.

The expression "adhesive" is intended to describe the quality of being able in principle to bring about an adhesive bond by means of an adhesive associated with the article identified, optionally after activation of the adhesive. Conversely, "tacky", and also synonymously "pressure-sensitively adhesive" and "self-adhesive", refers to the quality of exhibiting inherent tack at room temperature.

The invention relates in particular to a reactive adhesive.

As substances which are reactive in radical polymerization reactions it is possible to use compounds which as part of linking reactions proceeding by a radical mechanism (chain and/or polymer construction reactions and network-forming reactions) are able to react to form high molecular mass compounds (especially macromolecules and networks), and from which, therefore, macromolecules and/or polymer networks can be constructed via radical polymerization reactions. The polymerization reactions may proceed as a stepless polymerization reaction or as a polymerization reaction proceeding in steps. The polymerization reaction proceeds preferably in the form of addition polymerization by a radical chain-growth mechanism. In principle, other polymer construction reactions as well may take place, especially step-growth reactions, such as polyadditions or polycondensations, for example.

Polymers are understood for the purposes of this specification to be substances composed of a collective of macromolecules which are of chemically uniform or similar construction, but which differ generally in terms of degree of polymerization, molar mass, and chain length. "Chemically uniform construction" is also intended to include the case of monomers of statistical construction for which the composition of the constituent units is substantially identical, though the specific unit sequence in the macromonomers may vary in view of the statistical sequence from macromolecule to macromolecule.

Polymer networks (or else simply networks) is a term for those polymers whose molecular construction—especially as a result of linkage between the macromolecules originally present—resembles the form of a two-dimensional or three-dimensional network and which ultimately forms, accordingly, a single or a few giant molecule(s) (cf. Römpp online 2014). The terms "polymer network" and "crosslinked polymers" are understood synonymously for the purposes of this specification.

Given that both the polymer construction reactions and network-forming reactions lead to an increase in the cohesion of the adhesive composition, the polymerization reaction of the monomers thus brings about in particular a curing of the adhesive.

In one particularly preferred procedure, the adhesive is used in film form, in other words as adhesive tape or as part of an adhesive tape. Since the monomers—even in a blend with the catalytically active substances—generally do not have sufficient cohesion to be formed as a self-supporting film, it is advantageous, for adhesive bonding, to use an adhesive agent, in which the adhesive—that is, the monomers and the metal chelates and any additional adhesive constituents present—are present in a matrix, which will be referred to hereinafter as film-former matrix.

In order to generate sufficient cohesion in the adhesive, the latter may also have been admixed with a thickener, allowing it to be self-supportingly formed, either of itself—that is, without an additional matrix—or, as described above, in a matrix, particularly in the form of an adhesive film.

REACTIVE SUBSTANCE

The adhesive used for the method of the invention comprises reactive substances which are able to react as monomers in polymerization reactions (also referred to as "reactive monomers"). As substances which are reactive in radical polymerization reactions it is possible to use low molecular mass compounds having one or more functional groups, in other words monomers in the true sense of the word. Instead or additionally, however, it is also possible to use macromonomers—oligomers or short-chain polymers (for example, having number-average molecular weights $M_n$ of not more than 10 000 g/mol) having one or more functional groups, preferably at one end or at different ends of the usually chain-like molecule. Where this specification refers to "monomers", the reference is therefore to all substances which are reactive in radical polymerization reactions, thus not only low molecular mass monomers in the true sense of the word but also macromonomers, unless specifically stated otherwise. Here, the term "monomer" is describing not the individual molecule, but rather the particular monomer variety, unless something different is apparent from the context.

Substances which are reactive in radical polymerization reactions, i.e., reactive monomers, may be used, for example, as liquids of various viscosities or, for example, as resins. According to DIN 55947, the term "resin" encompasses "solid, hard to soft, organic, noncrystalline products having more or less broad molecular weight distribution". The resin molecules—as so-called reactive resins—have, completely or partially, functional groups which are able on activation to react in the aforementioned polymerization reactions.

The adhesive used in accordance with the invention comprises at least one reactive monomer (i.e., one monomer variety). Advantageously in accordance with the invention it is also possible for two or more reactive monomers (monomer varieties) to be used.

Advantageously in accordance with the invention, the reactive monomers are selected from the group consisting of acrylic acid, acrylic esters, methacrylic acid, methacrylic esters, vinyl compounds and/or oligomeric and/or polymeric compounds having carbon-carbon double bonds.

Reactive monomers in one preferred embodiment are one or more representatives selected from the group consisting of the following: methyl methacrylate (CAS No. 80-62-6), methacrylic acid (CAS No. 79-41-4), cyclohexyl methacrylate (CAS No. 101-43-9), tetrahydrofurfuryl methacrylate (CAS No. 2455-24-5), 2-phenoxyethyl methacrylate (CAS No. 10595-06-9), di(ethylene glycol) methyl ether methacrylate (CAS No. 45103-58-0) and/or ethylene glycol dimethacrylate (CAS No. 97-90-5).

In a further preferred embodiment in accordance with the invention, the adhesive agent comprises a mixture of cyclohexyl methacrylate, tetrahydrofurfuryl methacrylate, methacrylic acid, and ethylene glycol dimethacrylate as reactive monomers.

In a further preferred embodiment in accordance with the invention, the adhesive agent comprises a mixture of methyl methacrylate, methacrylic acid, and ethylene glycol dimethacrylate as reactive monomers.

In a further preferred embodiment in accordance with the invention, the adhesive agent comprises a mixture of 2-phenoxyethyl methacrylate and ethylene glycol dimethacrylate as reactive monomers.

In a further preferred embodiment in accordance with the invention, the adhesive agent comprises a mixture of di(ethylene glycol) methyl ether methacrylate and ethylene glycol dimethacrylate as reactive monomers.

As macromonomers it is possible for example to select oligomeric (meth)acrylates with mono-, di-, tri-, and higher functionalization. Very advantageously they are used in a mixture with one or more monomers from the group consisting of acrylic acid, acrylic esters, methacrylic acid, methacrylic esters, and vinyl compounds.

Each of these preferred embodiments may in accordance with the invention be combined with a thermoplastic polyurethane, such as Desmomelt 530®, for example, as polymeric film-former matrix.

It is advantageous if at least some of the reactive monomers used are chemical compounds which in addition to the polymerizable functional group have further reactive, functional groups and are therefore capable of providing linear molecule chains with these further groups, thus allowing three-dimensionally crosslinked structures to form from the two-dimensional structures, via formation of intermolecular bridges by way of these further functional groups.

In one particularly preferred embodiment in accordance with the invention, ethylene glycol dimethacrylate (CAS No. 97-90-5) is used as reactive monomer, especially preferably in combination with other reactive monomers.

CATALYTICALLY ACTIVE SUBSTANCE

For initiating the polymerization reactions, it has emerged as being very advantageous for a catalytically active substance or two or more catalytically active substances to be added to the adhesive. The catalytically active substances are not themselves consumed during the polymerization reaction.

At least one of the catalytically active substances is selected from the group consisting of metal phthalocyanines and metal porphyrins. Advantageously all catalytically active substances used are selected as metal phthalocyanines and/or metal porphyrins.

Very preferably the metals of the metal phthalocyanines, where such complexes are used, are selected from the group consisting of iron, cobalt, copper, nickel, aluminum, magnesium, manganese, tin, and zinc.

Very preferably the metals of the metal porphyrins, where such complexes are used, are selected from the group consisting of iron, cobalt, copper, nickel, aluminum, magnesium, manganese, tin, and zinc.

In a very preferred procedure, iron(II) phthalocyanine $[C_{32}H_{16}FeN_8]$ (CAS No. 132-16-1)—in particular, exclusively, but possibly also in combination with one or more further metal phthalocyanines and/or one or more further metal porphyrins—is used as catalytically active substance. An advantageous combination of catalytically active substances is, for example, that composed of iron phthalocyanine and one or more iron porphyrins.

The catalytically active substance(s), such as iron(II) phthalocyanine, for example, is or are used preferably in an amount of up to two parts by weight per 100 parts by weight of reactive monomers, more preferably in an amount of 0.1 to 1 part by weight per 100 parts by weight of reactive monomers.

FILM-FORMER MATRIX

In one advantageous procedure, the substances which are reactive in radical polymerization reactions are used in a film-former matrix, resulting in an adhesive agent comprising at least the matrix and the adhesive. The film-former matrix may be formed very advantageously by a polymer, and may therefore be present in the form of a polymeric film-former matrix. Present in the matrix are the reactive monomers, the catalytically active substances, and also any other constituents of the adhesive. In one preferred embodiment in accordance with the invention, the matrix contains exclusively the reactive monomers and the catalytically active substance(s).

The function of this matrix is to form an inert scaffold for the adhesive, allowing the latter in particular to be not in liquid form, but instead incorporated as a film or a sheet. In this way, greater ease of handling is ensured.

The matrix polymer is preferably selected such that it is inert for the polymerization reactions. Inert in this context means that the reactive monomers, under appropriately selected conditions, substantially do not react with the polymeric film-former matrix.

Suitable film-former matrices for use in the present invention are preferably selected from the following list: a thermoplastic polymer, such as a polyester or copolyester, a polyamide or copolyamide, a polyacrylic ester, an acrylic ester copolymer, a polymethacrylic ester, a methacrylic ester copolymer, thermoplastic polyurethanes, and also chemically or physically crosslinked substances of the compounds stated above. It is also possible, furthermore, to use blends of different thermoplastic polymers.

In order to stabilize the assembly of the adhesive systems of the invention with the substrate or substrates to be joined, after plasma activation and up until the required bonding strength is developed, it may be advantageous to make the matrix pressure-sensitively adhesive, in other words such that the matrix itself has an inherent tack, particularly at room temperature. For this purpose, recourse may be made to the pressure-sensitive adhesive systems familiar to the skilled person, such as to corresponding polyacrylates and polyurethanes.

Also conceivable, moreover, are elastomers and thermoplastic elastomers on their own or in a mixture as polymeric film-former matrix. Thermoplastic polymers, especially those which are semicrystalline, are preferred.

Particularly preferred are thermoplastic polymers having softening temperatures of less than 100° C. In this context, the term "softening point" stands for the temperature above which the thermoplastic granules stick to themselves. Where the constituent of the polymeric film-former matrix is a semicrystalline thermoplastic polymer, it very preferably has not only its softening temperature (which is connected with the melting of the crystallites) but also a glass transition temperature of not more than 25° C., preferably not more than 0° C.

In one preferred embodiment in accordance with the invention, a thermoplastic polyurethane is used. The thermoplastic polyurethane preferably possesses a softening temperature of less than 100° C., more particularly less than 80° C.

In one particularly preferred embodiment in accordance with the invention, the polymeric film-former matrix used comprises Desmomelt 530®, which is available commercially from Bayer MaterialScience AG, 51538 Leverkusen, Germany. Desmomelt 530® is a hydroxyl-terminated, largely linear, thermoplastic, highly crystallizing polyurethane elastomer.

In accordance with the invention, the amount of the polymeric film-former matrix is preferably in the range of about 20-80 wt %, preferably about 30-50 wt %, based on the total mixture of the constituents of the adhesive agent. Most preferred are 35-45 wt %, preferably about 40 wt %, of the polymeric film-former matrix, based on the total mixture of the constituents of the adhesive agent.

In accordance with the invention, the amount of the monomers in the film-former matrix is preferably in the range of about 20-80 wt %, preferably about 40-60 wt %, based on the total mixture of the constituents of the adhesive agent. Most preferred are about 40-50 wt % of the monomer, based on the total mixture of the constituents of the adhesive agent.

The total mixture of the adhesive agent here is the total amount of the film-former matrix, the reactive monomers, the catalytically active substance, and also further components, present optionally, that are used, obtained as the sum total (in wt %).

THICKENERS

In a further advantageous procedure, the viscosity of the substances which are reactive in radical polymerization reactions is increased significantly using a thickener. In principle it is possible here to select all thickeners familiar to the skilled person, provided they are compatible with the polymeric matrix, the monomer, and the solvent. The amount of thickener used is dependent on its nature and may be selected by the skilled person in accordance with the desired degree of viscosity.

FURTHER ADDITIVES

The adhesives of the present invention may optionally comprise further additives and/or auxiliaries which are known in the prior art. Deserving of mention here, for example, are fillers, dyes, nucleating agents, rheological additives, expandants, adhesion-boosting additives (adhesion promoters, tackifier resins), compounding agents, plasticizers and/or anti-aging agents, light stabilizers, and UV stabilizers, in the form for example of primary and secondary antioxidants.

It has proven very advantageous in accordance with the invention for the adhesives to be admixed with one or more substances capable of sorbing permeable substances—such as water vapor or oxygen. Such materials are referred to as getter materials or else, in abbreviated form, as getters. A getter material in the present specification, accordingly, is understood as a material which is able selectively to absorb at least one permeable substance. The getter material could therefore also be termed a "sorbent" or "sorption agent". The getter material is preferably capable at least of sorbing water.

Through the addition of getters it has been possible to achieve a substantial reduction in the time taken for the adhesive to cure, without severely lowering the working time.

In accordance with their function, the getter materials are used preferably as materials substantially free from permeates, being water-free, for example. This distinguishes getter materials from similar materials which are used as a filler. For example, silica in the form of fumed silica is used frequently as a filler. If, however, this filler is stored in the usual way under ambient conditions, it already absorbs water from the environment and is no longer functional as a getter material to a technically utilizable extent. Only dried silica or silica which has been kept dry can be utilized as a getter material. In accordance with the invention, however, it is also possible to use materials which are already partly complexed with permeates, examples being $CaSO_4*1/2H_2O$ (calcium sulfate hemihydrate) or partially hydrogenated silicas, which are present by definition as compounds of the general formula $(SiO_2)_m*nH_2O$.

Examples of suitable getter materials are as follows: salts such as cobalt chloride, calcium chloride, calcium bromide, lithium chloride, lithium bromide, magnesium chloride, barium perchlorate, magnesium perchlorate, zinc chloride, zinc bromide, silicas (for example, silica gel), aluminum sulfate, calcium sulfate, copper sulfate, barium sulfate, magnesium sulfate, lithium sulfate, sodium sulfate, cobalt sulfate, titanium sulfate, sodium dithionite, sodium carbonate, potassium disulfite, potassium carbonate, magnesium carbonate, titanium dioxide, kieselguhr, zeolites, phyllosilicates such as montmorillonite and bentonite, metal oxides such as barium oxide, calcium oxide, iron oxide, magnesium oxide, sodium oxide, potassium oxide, strontium oxide, aluminum oxide (activated alumina); additionally, carbon nanotubes, activated carbon, phosphorus pentoxide, and silanes; readily oxidizable metals such as, for example, iron, calcium, sodium, and magnesium; metal hydrides such as, for example, calcium hydride, barium hydride, strontium hydride, sodium hydride, and lithium aluminum hydride; hydroxides such as potassium hydroxide and sodium hydroxide, metal complexes such as, for example, aluminum acetylacetonate; furthermore, organic absorbers, examples being polyolefin copolymers, polyimide copolymers, PET copolyesters, anhydrides of monocarboxylic and polycarboxylic acids such as acetic anhydride, propionic anhydride, butyric anhydride or methyltetrahydrophthalic anhydride, isocyanates, or other absorbers based on hybrid polymers, used mostly in combination with catalysts such as cobalt, for example; further organic absorbers such as, for instance, weakly crosslinked polyacrylic acid, polyvinyl alcohol, ascorbates, glucose, gallic acid, or unsaturated fats and oils.

In accordance with the invention it is also possible to use mixtures of two or more getter materials.

Silicas, as described above, are compounds of the general formula $(SiO_2)_m*nH_2O$. They comprise silicon dioxide prepared by wet-chemical, thermal or pyrogenic processes. Particularly suitable getter materials among the silicas are silica gels, examples being silica gels impregnated with cobalt compounds as a moisture indicator (blue gel), and fumed silicas. Of the $SiO_2$ compounds, furthermore, kieselguhr is suitable, but is not generally considered to be one of the silicas.

By "silanes" are meant compounds of the general formula $R_a$—Si—$X_{4-a}$ or their partial condensation products. In the formula, a is an integer from 0 to 3 and is preferably 0 or 1. X is a hydrolysable group, as for example and preferably a halogen atom, more particularly chloro, an alkoxy group such as, for example, a methoxy, ethoxy, n-propoxy, isopropoxy, n-butoxy, sec-butoxy or tert-butoxy group, or an acetoxy group. Further examples of hydrolysable groups known to the skilled person can likewise be employed for the purposes of the present invention. Where there are two or more substituents X, they may be the same as or different from one another. R is an optionally substituted hydrocarbon radical. Where there are two or more substituents R, they may be identical to or different from one another.

"Carbodiimides" are compounds of the general formula $R^1$—N=C=N—$R^2$, where $R^1$ and $R^2$ are organic radicals, more particularly alkyl or aryl radicals, which may be identical or different.

The getter materials used are preferably selected from the group encompassing cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, potassium carbonate, magnesium carbonate kieselguhr, silicas, zeolites, phyllosilicates iron, calcium, sodium, magnesium, barium oxide, calcium oxide, iron oxide, magnesium oxide, sodium oxide, titanium dioxide, potassium oxide, strontium oxide, activated aluminum oxide carbon nanotubes, activated carbon, phosphorus pentoxide, silanes calcium hydride, barium hydride, strontium hydride, sodium hydride, and lithium aluminum hydride, potassium hydroxide, sodium hydroxide, and aluminum acetyl acetonate polyolefin copolymers, polyamide copolymers, PET copolyesters, acetic anhydride, propionic anhydride, butyric anhydride, methyltetrahydrophthalic anhydride, polyacrylic acid and polyvinyl alcohol, since these materials are very suitable as water getters.

With very particular preference the getter materials used are selected from calcium oxide, calcium sulfate, calcium chloride, and zeolites, and also from mixtures of two or more of the above substances. These materials have particularly high capacities for the absorption of water and other permeates, are very largely regenerable, can be incorporated outstandingly into the adhesive, and have only a negligible adverse effect, or none at all, on the function of this layer in the amount according to the invention.

The fraction of the getter materials in the adhesive is advantageously not more than 5 wt %, preferably not more than 1 wt %.

Alternatively or additionally thereto, the matrix may also comprise getter materials, very preferably one or more of the aforementioned getters.

PLASMA INITIATION

Exposure of the adhesive means to a plasma in the presence of the catalytically active substance initiates the polymerization reaction of the reactive monomers, leading to curing of the adhesive composition and so to the production of the adhesively bonded assembly. A plasma is a gas whose molecules, completely or partly, are in ionized form. The ionization takes place under the influence of electrical fields, and one of its results is the formation of radicals (in particular through fragmentation of gas molecules). As well as chemical species, various radiation components (e.g., VUV, UV, visible, IR, . . . ) may also be formed.

Plasma generation may in accordance with the invention take place in principle with all common plasma sources. Preferred in accordance with the invention are methods such as dielectric barrier discharge (DBD), corona discharge, or the generation of driven plasmas. Excitation by microwaves can also be used in numerous cases.

A driven plasma is understood to refer to any systems wherein the plasma is driven out by a stream of gas from the electrogeometry in which it is generated. Such methods are known by the name—among others—of PlasmaJet®, Plasma-Pen®, plasma blaster, corona gun (as a driven corona), to name only a few, without limitation.

In principle it is possible to use low-pressure plasmas, atmospheric pressure plasmas (standard pressure plasmas), and high-pressure plasmas. There is advantage in operating at a pressure in the range between 500 and 1200 hPa, more preferably at atmospheric pressure. In the case of atmospheric pressure plasma, the pressure corresponds essentially to that of the surrounding atmosphere, unless apparatus is used to raise or lower it, and the pressure therefore, depending on climatic conditions, is customarily approximately in the region of 1013±60 hPa (at sea level; standard pressure=1013.25 hPa).

In the case of low-pressure plasmas, care should advantageously be taken to ensure that the monomers, which are frequently in liquid form, do not boil. Typical industrial low-pressure plasmas are operated in the pressure range of a few (up to several hundred) pascals, in other words at pressures which are lower by a factor of 10 000 than the standard atmospheric pressure.

Depending on source and plasma generation conditions, a distance of a few tenths of millimeters up to several centimeters is selected between the adhesive composition to be plasma-treated—or, to be more exact, the surface thereof—and the plasma source.

Process gases used for plasma treatment may be the usual process gases. With particular advantage it is possible to use oxygen-containing process gases, such as, for example, (pure) oxygen, air, water vapor, or mixtures of two or more of the aforementioned gases, and/or mixtures with other gases, such as, for instance, nitrogen, noble gases (such as argon), and the like. Employed with particular advantage are humid gases (that is, gas mixtures containing water vapor).

The plasma treatment ought preferably to be conducted such that the process gas does not heat to more than 120° C., preferably not more than 60° C., in order not to stress the adhesive system and/or the substrates to be bonded. This may be achieved in particular by conducting plasma generation in such a way that the electrodes do not heat up above these temperatures.

The duration of the plasma treatment for efficient initiation of the polymerization reaction is generally a few seconds, as for example up to 20 seconds. A plasma treatment time of the surface for a duration of up to 15 seconds, more particularly from 3 to 10 seconds, has proven very favorable in order to ensure optimum strength of the adhesive bond.

There are a variety of plasma generators on the market, differing in the technology for plasma generation and in the gas atmosphere. Although the treatments differ in factors including the efficiency, the fundamental effects are usually similar and are determined in particular by the gas atmosphere employed. In accordance with the invention there is in principle no restriction on the choice of plasma generators, provided the aforementioned conditions can be realized.

In principle it is also possible to admix the atmosphere with reactive gaseous substances such as oxygen, hydrogen, ammonia, ethylene, $CO_2$, siloxanes, acrylic acids and/or solvents, and also coating or polymerizing constituents.

In order to maximize bond strengths, the polymerization reaction will be taken to substantially full conversion rates of the reactive monomers. By way of the time and the intensity of the plasma treatment and/or by way of the amount of catalyst used, however, the method of the invention also opens up the possibility for the ultimate bond strength to be varied/adjusted to desired levels.

BONDING METHODS

The adhesive can be employed in a variety of ways.

In a first embodiment, the adhesive is applied directly as a liquid to one of the substrates to be bonded, and is activated by plasma. The adhesive may be used without further additions, i.e., may comprise exclusively the reactive monomers and the catalytically active substances, or may have been admixed with the other additives stated. In particular, the presence of one or more thickeners in the adhesive may be used to increase its viscosity, giving the adhesive better handling qualities. After the end of plasma activation, the second substrate is placed on, and the adhesive is given opportunity to cure, thus bringing about the bonding of the substrates to one another.

In a second advantageous embodiment, the adhesive comprises thickener in a quantity such that it can be formed as a substantially shape-retaining layer. For greater ease of handling, for example, a layer of this kind may be presented on a temporary carrier, which has preferably been made antiadhesive. This layer is exposed to the action of plasma in order to initiate the curing reaction.

In a third favorable embodiment, the adhesive as already observed in more detail above is embedded into a matrix, with the matrix providing for sufficient dimensional integrity of the resultant adhesive agent. This adhesive agent as well is exposed to the action of plasma in order to initiate the curing reaction. The adhesive agent here may in principle take on any two- and three-dimensional forms, since the curing reaction, once initiated, is able to propagate even through relatively large three-dimensional structures.

With particular preference the adhesive agent comprising the matrix and the adhesive is used as an adhesive layer in film form.

Adhesive layers in film form are referred to generally below as adhesive film.

The adhesive films of the invention can be used in particular in adhesive tapes. This applies in principle to all adhesive films of the invention, particularly those described above, including in particular the adhesive films of the invention where the adhesive is in a matrix in film form. A multiplicity of adhesive tapes can be realized in accordance with the invention, as set out below. For all of the embodiments stated below it is the case that individual, two or more, or all of the exposed adhesive film surfaces (the outer surfaces of the outlying adhesive films) may be provided with liner materials (liners) for the purpose of their protection and for improved ease of handling.

single-layer adhesive tapes, consisting only of the adhesive film of the invention;

single-sidedly bondable adhesive tapes, where one of the outlying layers is formed by an adhesive film of the invention, and the other outlying layer is not adhesive, in the form of a permanent carrier layer, for instance, where the adhesive tape may be constructed exclusively from the two aforementioned layers, or where additionally, between the two aforementioned layers, further layers are present, such as further carrier layers, foam layers, damping layers, further adhesive layers or the like, or double-sidedly bondable adhesive tapes, where both outlying layers are formed by adhesive films of the invention, where the adhesive tape may be constructed exclusively from the two aforementioned layers, which, however, differ (for example in the choice of the matrix and/or in the choice of the adhesive), or where additionally, between the two outlying layers, further layers are present, such as further carrier layers, foam layers, damping layers, further adhesive layers or the like, and the two outlying adhesive films are identical, or where additionally, between the two outlying layers, further layers are present, such as further carrier layers, foam layers, damping layers, further adhesive layers or the like, and the two outlying adhesive films are different in composition (for example, through the choice of the matrix and/or through the choice of the adhesive) and/or in geometry (for example, the layer thickness), or double-sidedly bondable adhesive films where one of the outlying layers is formed by an adhesive film of the invention and the other of the outlying layers is formed by a noninventive adhesive film, for instance a pressure-sensitive adhesive, a hotmelt adhesive, a noninventive reactive adhesive or the like, where the adhesive may be constructed exclusively from the two aforementioned layers, or where additionally, between the two aforementioned layers, further layers are present, such as further carrier layers, foam layers, damping layers, further adhesive layers or the like, or single-sidedly or double-sidedly bondable multilayer adhesive tapes, where at least one of the inlying adhesive films is formed by an adhesive film of the invention.

In accordance with the invention, the adhesive tapes of the invention may comprise further films, layers, adhesives, and also permanent and/or temporary carriers. Suitable carrier materials are known to a person skilled in the art. As permanent carriers, for example, use may be made of film sheets [polyesters, polyethylene terephthalate (PET), polyethylene (PE), polypropylene (PP), monoaxially oriented PP (MOPP), biaxially oriented PP (BOPP), polyvinyl chloride (PVC), polyimides], nonwoven webs, foams, woven fabrics and/or woven-fabric sheets. Temporary carriers ought to be provided with a release layer, the release layer consisting generally of a silicone release varnish or a fluorinated release varnish, or being polyolefinic in character [high-density polyethylene (HDPE), low-density polyethylene (LDPE)]. It may, optionally, be desirable for the surfaces of the carriers to be pretreated by a physical, chemical and/or physicochemical method. Advantageous here, for example, is the application of a primer or of an adhesion promoter composition.

The activation of the polymerization reaction by plasma acts in particular on the surface which is exposed to the plasma. In the case, therefore, of adhesive films of the invention, especially those with a high fraction of catalytically active substances, and/or in the case of high concentrations of reactive components in the plasma, there may be a rapid reaction directly at the surface, but a slower reaction in the film interior. The cured layer in turn may optionally form a kind of "barrier effect" relative to the plasma. This may result either in the layer interior curing not fully or slowly, or else in the working time of the activated surface becoming short, with the possible consequence of problems with regard to sufficiently rapid application of the substrate to be bonded to said surface.

It may therefore be favorable, as described in the latter above-described working example for adhesive tapes, to configure the activatable adhesive layer of the invention as an inner layer of the adhesive tape, for instance as the second-from-outside layer, and to dispose, on this adhesive layer of the invention, for example, a noninventive adhesive layer which is exposed to the direct influence of plasma. The outer adhesive layer may be a layer, for example, in which monomers similar to the invention are presented in a matrix, but which contains no catalytically active substance.

Through the influence of the plasma, there is in this case no activation, or only relatively low activation, of a polymerization reaction, and the reaction in the adhesive film of the invention sets in only when radicals—generated either from the plasma or in the outer layer to a limited extent—have penetrated through the outer layer to reach the adhesive film of the invention. The outer adhesive film may also, for example, be a film which, while it is in accordance with the invention and comprises not only monomers but also at least one catalytically active substance, nevertheless has a significantly reduced content of the catalytically active substance, reduced for example by a multiple in comparison to the subsequent adhesive film of the invention (second-from-outside or even later layer).

With the aforementioned arrangement, success is achieved in significantly lowering the reaction rate within the outer adhesive film relative to an inlying adhesive film of the invention.

The treatment of the exposed surface of an adhesive film to be bonded takes place in principle in the same way for all variants according to the invention—namely, prior to the application of the substrate to be bonded to this surface. If present, the liner is first of all removed, after which the adhesive film surface is treated with plasma and the contact between the activated adhesive film and the substrate surface is produced within the working time, preferably immediately after the end of the plasma treatment.

In the case of the adhesive bonding of double-sidedly bondable adhesive tapes, there are various process sequences that can be carried out:

For instance, first of all both adhesive tape surfaces can be freed from any liner materials, and both surfaces can be treated simultaneously with plasma. The plasma treatment in this case may also take place in a single apparatus immediately after the removal of the liner materials. Then, simultaneously or in succession, within the working time, the two activated adhesive tape surfaces are brought into contact with the respective substrate surfaces to be bonded thereon. In order to increase the bond strength, pressure may be exerted on the bonding faces. After the adhesive films have cured, the assembly finally present is produced.

In another procedure, the two adhesive tape surfaces are freed independently of one another from any liner materials, treated independently from one another with plasma, and contacted independently from one another with the respective substrate surfaces. Thus, for example, the liner of the first adhesive tape surface can be removed, the first adhesive tape surface can be plasma-activated and then brought into contact with the first substrate surface, and thereafter the second adhesive tape surface is exposed, plasma-treated, and subsequently bonded to the second substrate.

In a third procedure, which may for example—but not exclusively—be of interest for single-layer adhesive films, only one of the adhesive tape surfaces of a double-sidedly bondable adhesive tape is activated. The adhesive film contacted with the two substrate surfaces is then able to cure, beginning from one side toward the other side, and is able thus to bring about the adhesive assembly. The sequence of the contacting of the surfaces with the plasma-activated adhesive tape surface and the untreated surface may be adapted here to the particular circumstances.

It has emerged that customary working time of the adhesive systems—especially of the adhesive films—after their activation is up to several minutes or even several tens of minutes. Within this time, the activated adhesive systems can be brought into contact with the substrates to be bonded, and the assembly may be arranged and positioned as desired. The time for the bond to cure is customarily several hours.

For preliminary fixing in the case of positioning and/or in order to stabilize the assembly in the period after plasma activation and assembly through to complete formation, it may be advantageous if the adhesive systems—especially adhesive films—are of pressure-sensitive adhesive configuration, through the use for instance of a film-former matrix which has inherent tack, or of self-adhesive thickeners or thickeners that render the thickened adhesive self-adhesive.

Alternatively or additionally it may be advantageous to stabilize the assembly by means of appropriate mechanical measures (mounting devices, clamping devices or the like) until curing has progressed to an extent such that the adhesive forces are sufficient to hold the assembly together.

SUBSTRATES

Suitable substrates for bonding using the reactive adhesive-film system of the invention are metals, glass, wood, concrete, stone, ceramic, textile and/or plastics. The substrates to be bonded may be alike or different.

In one preferred embodiment the reactive adhesive-film system of the invention is used for bonding metals, glass, and plastics. In one particularly preferred embodiment in accordance with the invention, polycarbonates and anodized aluminum are bonded.

The metal substrates for bonding may be fabricated generally from all familiar metals and metal alloys. Employed with preference are metals, such as, for example, aluminum, stainless steel, steel, magnesium, zinc, nickel, brass, copper, titanium, ferrous metals, and alloys. The parts to be bonded may also be constructed from different metals.

Examples of suitable substrate plastics are acrylonitrile-butadiene-styrene copolymers (ABS), polycarbonates (PC), ABS/PC blends, PMMA, polyamides, glass fiber-reinforced polyamides, polyvinyl chloride, polyvinylene fluoride, cellulose acetate, cycloolefin copolymers, liquid-crystal polymers (LCP), polylactide, polyetherketones, polyetherimide, polyethersulfone, polymethacrylomethylimide, polymethylpentene, polyphenylether, polyphenylenesulfide, polyphthalamide, polyurethanes, polyvinyl acetate, styrene acrylonitrile copolymers, polyacrylates and polymethacrylates, polyoxymethylene, acrylate-styrene-acrylonitrile copolymers, polyethylene, polystyrene, polypropylene and/or polyesters, such as polybutylene terephthalates (PBT) and/or polyethylene terephthalate (PET), for example.

Substrates may have undergone coating, printing, vapor deposition or sputtering.

The substrates to be bonded may take on any desired form needed for the use of the resultant assembly element. In the most simple form, the substrates are planar. It is also possible, moreover, for three-dimensional substrates, with inclinations, for example, to be bonded using the adhesive means of the invention. The substrates to be bonded may also take on a very wide variety of different functions, such as—for example—housings, viewing windows, stiffening elements, etc.

Optionally it may be desirable for the surfaces of substrates to be bonded to be pretreated by a physical, chemical and/or physicochemical technique. Advantageous here, for example, is a plasma pretreatment and/or the application of a primer and/or of an adhesion promoter composition.

In view of the gentle process regime, particularly at low temperatures, the method of the invention can also be employed with advantage in particular for those applications where the bonding is of very sensitive substrates.

The bonding method of the invention is applicable in principle to all fields of industry. Particular suitability comes about, for example, for electronic devices, such as for display bonding, for example, and also for the automobile sector. For temperature-sensitive bonding substrates as well, with high mechanical stresses and/or for narrow strut widths, the method of the invention is very suitable.

Not only the adhesive assemblies produced with the bonding method of the invention but also the adhesives of the invention themselves, for instance in particular in the form of adhesive film or adhesive tape (in this regard, see in particular the section below headed "Methods for producing adhesive films"), are notable for very high robustness. Accordingly, the bonding methods of the invention and the use of the adhesives of the invention are also particularly suitable, in addition to other applications, in those where the components which have such bonding or whose production entails a corresponding bond in accordance with the invention are subjected to further process steps, in the course of which these parts are exposed to further loads, of mechanical, chemical and/or other nature, for instance. However, in those applications where the use of the components in the manner intended involves their exposure to high loads, the components having bonds of the invention are also outstandingly suitable.

In the automobile sector, for instance, components—such as the vehicle body, for example—are frequently subjected to further process steps, examples being finishing operations. Electrophoretic finishing (electrodepositing coating) represents a dipping process wherein the coating takes place by exposure to an electrical field (50 to 400 V). The body to be coated, which conducts the electrical current, is introduced as an anode or cathode into the paint bath; in practice, the tank wall acts as a second electrode. The quantity of coating material deposited is directly proportional to the quantity of current supplied. Electrophoretic finishing is employed in particular for the priming of automobile bodies. There are no spray losses, and the coatings obtained are very uniform, even in difficult-to-access areas. In the case of nonconducting substrates, such as plastics, glass, ceramic and so on, coating takes place using electrostatic charging of the paint particles (known as electrostatic finishing).

Within the automobile industry, preference is given to cathodic deposition coating (cathodic electrocoating). The electrocoating bath consists to an extent of about 80% of water; 19% are binders and pigments, only about 1 to 2% are organic solvents. The pH is slightly acid and is situated at around 6 to 6.5. The deposition mechanism breaks down into a number of stages: The water-insoluble synthetic resin becomes dispersible in water only in conjunction with an organic acid. In the region of the negatively charged workpiece (cathode), the evolution of hydrogen results in alkaline boundary-layer formation (pH 11 to 13). The increased concentration of OH— of the workpiece surface causes the aqueously dissolved paint to coagulate, and this paint is deposited in the form of a fine layer on the component. In order to prevent sedimentation and to rule out the development of dead spaces, the bath in the tank is agitated with an average flow velocity of about 0.2 m/s, with the bath circulated 4 to 6 times per hour, based on the tank capacity. With paint consumption of 2 to 3 kg/body and with a not inconsiderable evaporation of water at bath temperatures around 30° C., continual regulation of the bath composition is necessary. The organic acids liberated at the anode are separated off by a dialysis system, and in this way the pH of the bath is kept stable.

This is followed by a multistage rinsing zone with ultrafiltrate from paint recovery or with fully demineralized water.

The coating is baked at about 180° C.; the film thickness is 20 to 30 μm. Depending on the particular variant of the process, an additional, second coating film is applied as a filler layer. Only then does actual finishing take place with the color-imparting topcoat, and also with the clearcoat.

The adhesive of the invention (in the form of an adhesive film, for example) and the adhesive bonds produced by means of the method of the invention withstand a finishing operation, such as a cathodic electrocoating operation, for example, and do not notably impair the finishing operation or the media employed therein. In particular, there is no substantial reduction in the useful life of an electrocoating bath.

While the body of a motor vehicle is indeed customarily cleaned to remove adhering impurities such as greases, oils, and particles of dirt, in a multistage degreasing and rinsing zone, it is not possible to rule out residues of oil remaining on the metal sheets. Furthermore, in bodywork assembly, for example, it is usual for the oiled metal sheets to be equipped with adhesives or adhesive tapes even prior to cleaning.

The adhesive of the invention develops sufficient adhesion even on oiled substrates.

The wetting of the substrates by the adhesive of the invention is effective enough to prevent any water penetrating the bond area, thereby preventing later corrosion caused by the penetrated water. Particularly if the adhesive of the invention—in the form of an adhesive tape, for example—has been given a foamable formulation, through the addition, for example, of expandable hollow microspheres or of a chemical foaming agent, hollow spaces can be filled and cavities can be sealed to prevent water penetration.

In the course of curing or crosslinking, the adhesive of the invention also exhibits no contraction such that, for example, cracks occur in a coated substrate surface—a painted substrate surface, for example—or even such that sections of coating material are pulled from the coherently painted surface lined with the adhesive of the invention/by the adhesive tape of the invention.

Finally, the adhesive of the invention ensures galvanic separation of the substrates bonded to one another.

METHODS FOR PRODUCING ADHESIVE FILMS

Where the adhesives of the invention are employed in the form of adhesive films, as for example in adhesive tapes, the adhesive films are produced preferably by the method described hereinafter:

In a first step, the ingredients are finely divided or dissolved in one or more solvents and/or water. Alternatively there is no need for solvents and/or water, since the ingredients are already completely soluble in one another (where appropriate, with exposure to heat and/or shearing). Suitable solvents are known in the prior art, preference being given to the use of solvents in which at least one of the ingredients has good solubility. Particularly preferred is acetone.

As used herein, the term "ingredient" embraces the film-former matrix—in particular, a polymeric film-former matrix—; at least one reactive monomer (i.e., at least one substance which is reactive in radical polymerization reactions); at least one metal chelate from the group of the metal phthalocyanines and/or from the group of the metal porphyrins; and also, optionally, further additives and/or auxiliaries, as defined above.

Subsequently, in a second step, the dissolved or finely divided ingredients are mixed. The mixture is produced using customary stirring equipment. The solution optionally is also heated. Optionally, the ingredients are at the same time dissolved or finely divided and mixed.

Thereafter, in a third step, a release paper or a release sheet, a carrier material or a pressure-sensitive adhesive is coated with the mixture of the dissolved or finely divided ingredients according to step 2. Coating takes place by the usual techniques, which are known in the prior art.

After coating, in a fourth step, the solvent is removed by evaporation, to give an adhesive film.

Optionally, in a further step, the adhesive film may be wound into a roll and/or converted.

For storage, the reactive adhesive films of the invention are advantageously lined with a release liner or release paper.

Alternatively, the adhesive films of the invention are produced in solvent-free form by extrusion, hotmelt die coating or calendering.

EXPERIMENTAL SECTION

Examples

In a first production mode, a 20% strength acetonic solution of the film-former matrix (PU solution) is prepared first of all. This is done by weighing out 120 g of Desmomelt 530® (cf. details above) and 480 g of acetone into a screw-closure glass, and then closing the screw-closure glass. The screw-closure glass is rolled for a number of days on a roller bed, which brings about complete dissolution of the Desmomelt 530®. Depending on the rolling rate, the operation lasts for about one to seven days. Alternatively, the acetonic solution can also be produced by stirring the Desmomelt 530® pellets in acetone using a commercial laboratory stirrer.

Subsequently, in proportions according to the listing below (table 1), the thus-prepared 20% strength acetonic solution of Desmomelt 530®, 2-phenoxyethyl methacrylate, ethylene glycol dimethacrylate, iron(II) phthalocyanine, and optionally Purmol® 3STH getter (zeolite (molecular sieve); pore size 0.3 nm (3 Å), particle size <30 μm, water absorption capacity 23%; from Zeochem) are mixed for 10 minutes using a commercial laboratory stirrer.

In another production mode, a 30% strength solution of Saran F-310® [noncrystalline, thermoplastic vinylidene chloride-acrylonitrile copolymer, poly(vinylidene chloride-co-acrylonitrile); CAS No. 9010-76-8] in acetone is mixed with 2-phenoxyethyl methacrylate, ethylene glycol dimethacrylate, iron(II) phthalocyanine, and Purmol 3STH getter for 10 minutes using a commercial laboratory stirrer (for proportions see example 5 in table 1).

TABLE 1

All amounts in wt %; for PU and F310, the solids content is stated (without acetone)

| | PU | F310 | PEM | EGDM | EPC | 3STH |
|---|---|---|---|---|---|---|
| Example 1 | 68.1 | | 30 | 1.4 | 0.5 | |
| Example 2 | 68.1 | | 25.5 | 1.4 | 0.5 | 4.5 |
| Example 3 | 68.5 | | 25.6 | 1.4 | | 3 |
| Example 4 | 65.5 | | 24.5 | 1.35 | 0.65 | 8.6 |
| Example 5 | | 71.2 | 22.2 | 1.2 | 0.2 | 5.2 |
| Example 6 | 68.1 | | 30 | 1.4 | 0.33 | |

PU: Desmomelt 530 ®, used as 20% solution in acetone
F310: Saran F310 ®, used as 30% solution in acetone
PEM: 2-phenoxyethyl methacrylate
EGDM: Ethylene glycol dimethacrylate
EPC: Iron(II) phthalocyanine
3STH: Purmol 3STH ® getter The homogeneous mixture obtained in each case is coated out using a commercial laboratory coating unit (for example, from SMO (Sondermachinen Oschersleben GmbH)) with a coating knife on a siliconized polyester terephthalate sheet. The acetone is subsequently evaporated off in a drying cabinet at 60° C. to 80° C. for 10 minutes. The slot width on coating out is set such that evaporation of the solvent leaves a film having a thickness of 150 μm. The pressure-sensitively adhesive film obtained is lined with a siliconized polyester sheet prior to bonding.

Before the plasma treatment, the adhesive films located between the siliconized polyester sheets were each cut into rectangular specimens measuring 13 mm*20 mm.

Plasma treatment took place with a dielectrically hindered surface discharge geometrically comparable with Oehmigen et al., *Plasma Processes and Polymers* 7, 2010. The dielectric was fabricated from $Al_2O_3$. The electrode structure was lined with a protective layer of glass on the side facing the substrate. The plasma was excited with a sinusoidal high voltage of 9.2 kV at a frequency of 15.9 KHz. The treatment times varied between 1 s and 10 s.

In a first series of tests, adhesive film specimens of examples 1 to 5 were treated on one side with plasma. For a single-side initiation, the liner was first removed from one side of the specimens, and the adhesive was adhered over the full area onto a shear test plate made of steel (stainless steel 302 according to ASTM A 666; 50 mm×125 mm×1.1 mm, glossy annealed surface, surface roughness 50±25 nm arithmetic mean deviation from the baseline). The adhesive face now exposed was treated in the plasma at a distance of about 0.3 mm from the electrode. Subsequently, within 2 minutes, a second steel shear test plate (specification as for first steel plate) was joined onto the second adhesive film face and pressed on briefly by hand.

Results

TABLE 2

| | Treatment method | Result |
|---|---|---|
| Example 1 | Plasma | Adhesive film becomes solid |
| Example 1 | UV | No polymerization/crosslinking, adhesive film retains original condition |
| Example 2 | Plasma | Adhesive film becomes solid, faster than for example 1 with plasma treatment |
| Example 3 | Plasma | No polymerization/crosslinking, adhesive film retains original condition |
| Example 4 | Plasma | Adhesive film becomes solid |
| Example 5 | Plasma | Adhesive film becomes solid |

The curing time is generally less than 16 hours, but partial strength is achieved after just a few hours.

The specimens produced with the adhesive according to example 6 in table 1 and with the protocols above were plasma-treated on both sides, and their shear strength was measured after curing.

For this purpose, first of all, the liner was removed from one side of the specimens, and the top face of the adhesive film, which was now exposed, was treated in the plasma, in accordance with the plasma treatment conditions stated above, at a distance of about 0.3 mm from the electrode.

Subsequently, within 2 minutes, a first shear test plate made of steel (stainless steel 302 according to ASTM A 666; 50 mm×125 mm×1.1 mm, glossy annealed surface, surface roughness 50±25 nm arithmetic mean deviation from the baseline) was joined onto the treated side of the adhesive film, so that the adhesive film surface was fully covered, and was pressed on briefly by hand, after which the second liner was removed. The as yet untreated side of the adhesive film, which was now exposed, was subsequently treated in a plasma under the same conditions, and a second steel shear test plate (specification as for the first steel plate) was joined onto the treated second side of the adhesive film, so that this side as well was fully covered, and was likewise pressed on briefly by hand. Produced accordingly was an assembly composed of the two steel plates bonded in parallel by the adhesive film. The bond area between the steel plates was therefore 260 mm² (adhesive film specimen dimensions 13 mm×20 mm; see above). The positioning of the bond of the steel plates took place with a slight offset, so that one steel plate in each case jutted out somewhat from two opposing sides of the assembly. The adhesively bonded assembly was then cured for a time of 16 hours.

For the measurement of the shear strength, the assembly was clamped into a tensile testing machine, by clamping the protruding edge of one of the steel plates into a mount of the tensile testing machine, and the opposite protruding edge of the second steel plate into a second mount of the tensile testing machine. Using the tensile testing machine, the two steel plates could be pulled apart parallel to one another, with the bond exposed to shearing. The maximum force immediately before failure of the bonded assembly (parting of the steel plates from one another) was ascertained, and is reported in table 2, based in each case on the bond area.

TABLE 3

Measurement values for different plasma conditions with reference to example 6

| Treatment side | Treatment time per side [s] | Shear strength [MPa] |
| --- | --- | --- |
| One-sided | 1 | 0.38 ± 0.14 |
| Double-sided | 1 | 1.92 ± 0.45 |
| Double-sided | 2 | 2.96 ± 0.30 |
| Double-sided | 5 | 3.68 ± 0.03 |
| Double-sided | 10 | 3.71 ± 0.04 |

The invention claimed is:

1. A method comprising:
providing an adhesive agent comprising an adhesive comprising at least one reactive substance and at least one catalytically-active substance;
applying the adhesive agent between a first substrate and a second substrate; and
exposing the at least one reactive substance to a plasma, thereby causing the at least one reactive substance to undergo a polymerization reaction,
wherein:
the at least one catalytically-active substance comprises a first substance selected from the group consisting of a metal phthalocyanine, a metal porphyrin, or a metal phthalocyanine and a metal porphyrin; and
the polymerization reaction initiates curing of the adhesive.

2. The method as claimed in claim 1, wherein the adhesive agent further comprises a polymeric film-former matrix.

3. The method as claimed in claim 2, wherein the polymeric film-former matrix comprises a thermoplastic polymer.

4. The method as claimed in claim 3, wherein the thermoplastic polymer comprises a second substance selected from the group consisting of a thermoplastic polyurethane, an elastomer, or a thermoplastic elastomer.

5. The method as claimed in claim 1, wherein the adhesive further comprises a thickener.

6. The method as claimed in claim 1, wherein:
the adhesive further comprises a getter material;
the adhesive agent further comprises a getter material; or
the adhesive further comprises a first getter material and the adhesive agent further comprises a second getter material.

7. The method as claimed in claim 1, wherein:
the adhesive is in a film form;
the adhesive agent is in a film form; or
each of the adhesive and the adhesive agent is in a film form.

8. The method as claimed in claim 1, wherein:
the adhesive has pressure-sensitive properties;
the adhesive agent has pressure-sensitive adhesive properties; or
each of the adhesive and the adhesive agent has pressure-sensitive adhesive properties.

9. The method as claimed in claim 1, wherein:
the adhesive does not have pressure-sensitive adhesive properties;
the adhesive agent does not have pressure-sensitive adhesive properties; or
neither the adhesive nor the adhesive agent has pressure-sensitive adhesive properties.

10. The method as claimed in claim 1, wherein:
the metal phthalocyanine is present and comprises a second substance selected from the group consisting of an iron phthalocyanine, a cobalt phthalocyanine, a copper phthalocyanine, a nickel phthalocyanine, an aluminum phthalocyanine, a magnesium phthalocyanine, a manganese phthalocyanine, a tin phthalocyanine, or a zinc phthalocyanine; or
the metal porphyrin is present and comprises a second substance selected from the group consisting of an iron porphyrin, a cobalt porphyrin, a copper porphyrin, a nickel porphyrin, an aluminum porphyrin, a magnesium porphyrin, a manganese porphyrin, a tin porphyrin, or a zinc porphyrin.

11. The method as claimed in claim 10, wherein:
the metal phthalocyanine is present and comprises an iron phthalocyanine; or
the metal porphyrin is present and comprises an iron porphyrin.

12. The method as claimed in claim 1, wherein the metal phthalocyanine is present and comprises iron (II) phthalocyanine.

13. The method as claimed in claim 1, wherein the metal porphyrin is present and comprises one or more cobalt porphyrins.

14. The method as claimed in claim 1, further comprising applying a stationary or flowing-process gas atmosphere to the at least one reactive substance.

15. The method as claimed in claim 1, wherein the plasma is generated under atmospheric pressure.

16. The method as claimed in claim 1, wherein the plasma is disposed in water vapor or air.

17. The method as claimed in claim 16, wherein the air comprises moisture.

18. The method as claimed in claim 1, wherein:
- the plasma comprises a reactive gaseous substance, a coating constituent, or a polymerizable constituent, or
- the plasma is admixed with a reactive gaseous substance, a coating constituent, or a polymerizable constituent.

19. The method as claimed in claim 1, wherein:
- the adhesive is foamed after the polymerization reaction;
- the adhesive agent is foamed after the polymerization reaction; or
- each of the adhesive and the adhesive agent is foamed after the polymerization reaction.

20. An adhesive agent comprising an adhesive comprising:
- at least one reactive substance capable of reacting in a radical polymerization reaction upon exposure to a plasma; and
- at least one catalytically-active substance, wherein:
- the at least one catalytically-active substance comprises a second substance selected from the group consisting of a metal phthalocyanine, a metal porphyrin, or a metal phthalocyanine and a metal porphyrin; and
- the radical polymerization reaction can be initiated by the plasma.

* * * * *